US012338053B2

(12) United States Patent
Bodenmüller et al.

(10) Patent No.: US 12,338,053 B2
(45) Date of Patent: Jun. 24, 2025

(54) CARTRIDGE AND CONNECTOR FOR A CARTRIDGE

(71) Applicant: medmix Switzerland AG, Haag (CH)

(72) Inventors: Tobias Bodenmüller, Haag (CH); Richard Lavelanet, Balgach (CH)

(73) Assignee: medmix Switzerland AG, Haag (CH)

(*) Notice: Subject to any disclaimer, the term of this patent is extended or adjusted under 35 U.S.C. 154(b) by 0 days.

(21) Appl. No.: 17/630,395

(22) PCT Filed: Jun. 24, 2020

(86) PCT No.: PCT/EP2020/067615

§ 371 (c)(1),
(2) Date: Jan. 26, 2022

(87) PCT Pub. No.: WO2021/018484

PCT Pub. Date: Feb. 4, 2021

(65) Prior Publication Data

US 2022/0315311 A1 Oct. 6, 2022

(30) Foreign Application Priority Data

Jul. 29, 2019 (EP) .................................... 19188750
Feb. 19, 2020 (EP) .................................... 20158124

(51) Int. Cl.
*B65D 81/32* (2006.01)
*B05C 17/005* (2006.01)

(52) U.S. Cl.
CPC .... *B65D 81/3288* (2013.01); *B05C 17/00513* (2013.01); *B05C 17/00553* (2013.01); *B05C 17/00596* (2013.01)

(58) Field of Classification Search
CPC ........ B05C 17/00596; B05C 17/00513; B05C 17/00553; B65D 81/3288
USPC ........................................................ 220/23.4
See application file for complete search history.

(56) References Cited

U.S. PATENT DOCUMENTS

| | | | | |
|---|---|---|---|---|
| 7,291,133 | B1 * | 11/2007 | Kindler | A61M 5/36 604/247 |
| 8,596,499 | B2 | 12/2013 | Vogt et al. | |
| 8,608,030 | B2 | 12/2013 | Vogt et al. | |
| 9,339,317 | B2 | 5/2016 | Vogt et al. | |
| 9,975,139 | B2 * | 5/2018 | Turner | B05C 17/01 |
| 10,099,838 | B2 * | 10/2018 | Dean | B65D 39/0052 |
| 10,639,088 | B2 | 5/2020 | Vogt et al. | |

(Continued)

FOREIGN PATENT DOCUMENTS

| | | | |
|---|---|---|---|
| AU | 2018202045 | B2 | 10/2018 |
| EP | 3320869 | B1 | 5/2018 |

(Continued)

OTHER PUBLICATIONS

International Search Report issued Oct. 6, 2020 in corresponding International Application No. PCT/EP2020/067615.

*Primary Examiner* — Rafael A Ortiz
(74) *Attorney, Agent, or Firm* — Global IP Counselors, LLP

(57) ABSTRACT

A cartridge includes a head part including an aperture leading from an outer side of the head part to a cartridge chamber and a connector sealingly insertable into and removable from the aperture, the connector having a film extending over a surface of the connector with the surface facing the cartridge chamber.

13 Claims, 4 Drawing Sheets

(56) References Cited

U.S. PATENT DOCUMENTS

| | | | | |
|---|---|---|---|---|
| 2004/0164104 | A1 * | 8/2004 | Laible | B67D 7/0294 222/518 |
| 2004/0206786 | A1 * | 10/2004 | Laible | B67D 7/0294 222/507 |
| 2007/0095865 | A1 * | 5/2007 | Chick | B05C 17/00596 222/327 |
| 2011/0272434 | A1 | 11/2011 | Vogt et al. | |
| 2014/0205725 | A1 * | 7/2014 | Albanese | A47J 31/20 426/433 |

FOREIGN PATENT DOCUMENTS

| | | | | |
|---|---|---|---|---|
| WO | WO-2013056874 A1 * | 4/2013 | | B01F 13/0023 |
| WO | 2013078036 A1 | 5/2013 | | |
| WO | 2016036620 A1 | 3/2016 | | |
| WO | WO-2018135814 A1 * | 7/2018 | | B05B 11/00 |
| WO | WO-2019125856 A1 * | 6/2019 | | B05C 17/005 |

* cited by examiner

CARTRIDGE AND CONNECTOR FOR A CARTRIDGE

CROSS-REFERENCE TO RELATED APPLICATIONS

This application is a U.S. National Stage application of International Application No. PCT/EP2020/067615, filed Jun. 24, 2020, which claims priority to European Patent Application No. 19188750.4, filed Jul. 29, 2019 and European Patent Application No. 20158124.6, filed Feb. 19, 2020, the contents of each of which are hereby incorporated by reference.

BACKGROUND

Field of the Invention

The present disclosure relates to a cartridge and a connector, wherein the connector can be sealingly inserted into and removed from an aperture of a head part of the cartridge.

Background Information

Cartridges filled with a material, such as for example a mastic material, are commonly used in the industrial sector, such as for example in the construction industry or in the transportation industry. Cartridges filled with components of a mastic medium are frequently used to store the mastic materials and to dispense them for the respective application as required. Examples for such a mastic medium are joint sealing compounds or adhesives common for example in the construction sector. These cartridges are usually produced from plastic and are manufactured in an injection molding process.

A distinction is made between single-component systems in which the material to be dispensed is only made of one component and two-component or multicomponent systems in which at least two different components are stored in separate chambers of the same cartridge or in separate cartridges, wherein the multi-components are intimately mixed on dispensing by a dynamic or static mixing apparatus.

Examples are two-component adhesives which only harden after the mixing of the two components. Two-component systems are also used in the industrial sector for paints which are often used to generate functional protective layers such as for corrosion protection. Other applications are found for oil and petroleum products or for mastic asphalt concrete.

SUMMARY

Conventional cartridges filled with a medium are usually designed for a one-way use. Due to its adhesive nature, the mastic medium for example will usually never be entirely dispensed from the cartridge and residues will be left over within the cartridge. At present it is therefore common practice to not refill cartridges. This causes considerable waste.

For this reason, it is an object of the present disclosure to create a cartridge for dispensing a medium to reduce a required storage space for storing the cartridges as well to lower a carbon footprint.

This object is satisfied by a cartridge comprising a head part, the head part comprising an aperture leading from an outer side of the head part to a cartridge chamber of the cartridge. The cartridge chamber can be optionally filled with a material, as for example a mastic medium. The cartridge further comprises a connector, with said connector being sealingly insertable into and removable from the aperture. The connector further optionally comprises a film extending over a surface of the connector with said surface facing the cartridge chamber.

The connector can be a terminal connector. In other words, the terminal connector only seals off the aperture of the head part when it is inserted into the aperture.

The connector can be removed for filling, i.e. single use applications, or refilling, i.e. multi-use applications, the cartridge chamber with the medium through the aperture of the head part. For this, the aperture of the head part can be configured as a filling port of the cartridge.

Alternatively, the connector can be used for filling or refilling. In this embodiment, the connector can comprise an outlet having a passage arranged therein for connecting the cartridge chamber to a further component, such as for example a filling mandrel of a storage container or of a filling station for filling the cartridge chamber. The connector can therefore provide a support for a filling process. The outlet of the connector allows a precise positioning of the cartridge at the storage container and/or filling station. Furthermore, the outlet can be designed to fit a specific filling mandrel designed to refill the cartridge with a specific component or medium. In this way, a risk for refilling the respective cartridge chamber of the cartridge with another component as the component stored by the respective cartridge chamber can be reduced.

The film can be a multi-layer film. This allows the use of different layers, with each layer designed to particularly well bond with either the material of the connector or the material of the head part of the cartridge. The film can extend over the complete surface facing the cartridge chamber. In other words, the film can entirely cover the aperture of the head part. The film can be configured to burst in the region of the outlet of the connector on applying a dispensing pressure on the cartridge. The film can therefore seal the outlet when arranging the connector for the first time upon the aperture of the head part. Once the connector has been used as an outlet for dispensing the medium or material of the cartridge chamber, the film bursts in order to provide an aperture through which the medium can flow. Upon refilling, the connector can be exchanged with another connector that comprises an intact film extending over the complete surface facing the cartridge chamber.

Alternatively, the film can comprise an aperture in the region of an outlet from the cartridge chamber. The outlet can be provided by the aperture of the head part and/or the connector. The medium can freely flow through the aperture of the film.

The cartridge can be one of a film bag cartridge and a solid cartridge. If a film bag cartridge is used this can be either pre-collapsed for filling or inflated for filling. Regardless of whether a film bag cartridge or a solid cartridge is used, the cartridge can be a single component cartridge or a multi-component cartridge. Said cartridge can be one of a side by side cartridge, a click together cartridge or a coaxial cartridge.

The cartridge can be designed to be re-used respectively the cartridge chamber can be designed to be refilled with a respective medium or component at least for a second time. Such a refillable cartridge provides a plethora of new storage options. For example, a reduced number of cartridges will be brought to remote locations while storing most of the material component in one or more large containers or tanks at the remote location. With this, a total weight and the space taken up by the rigidly formed cartridge chambers can be lowered. As a result, a storage space can be optimized to comprise as much material component as possible and/or to weigh as little as possible, which is particularly favorable in confined locations such as on construction sites, on oil platforms, on ships and/or on airplanes.

When transporting a certain amount of the material component, a weight required to be transported including the weight of the cartridges is equally reduced as fewer cartridges are needed. Therefore, embodiment of the invention provide the further advantage of providing a possibility to reduce a carbon footprint for transporting material components and their respective cartridges.

This is particularly beneficial when using for example mastic materials in remote locations, such as construction sites or offshore platforms, where a particularly high number of mastic cartridges have to be stored on site using up a lot of a limited and much needed storage space. Furthermore, in the context of environmental protection, the avoidance of a one-way usage of a high number of plastic cartridges is particularly beneficial.

In this connection it should be noted that a mastic material is generally regarded as a material that either on its own or through the addition of a hardener solidifies on use of the respective material to form a bond at or between components. The cartridge chamber can be filled with a material, for example, with a material selected from the group of members consisting of topical medications, medical fluids, wound care fluids, cosmetic and/or skin care preparations, dental fluids, veterinary fluids, adhesive fluids, disinfectant fluids, protective fluids, paints and combinations of the foregoing. For example, the material comprises silicon, 2K adhesives or a mold material.

Preferably, the aperture is separate from an outlet of the cartridge. In other words, the cartridge further comprises an outlet for dispensing a medium respectively a material component, with the outlet being different from the aperture.

For example, the head part of the cartridge can further comprise such a dispensing outlet. A cartridge chamber of the cartridge is therefore designed to be filled respectively refilled with the medium via the aperture, wherein the medium is dispensed via the separate outlet. This is in particular advantageous for a two-component cartridge with two chambers filled with different components, wherein each component of the cartridge is dispensed via the same dispensing outlet. In order to reduce a risk of a premature combining or mixing of the two components upon refilling, each cartridge chamber is filled via its own aperture that is different from the common dispensing outlet.

Alternatively, the connector comprises an outlet from the cartridge, the outlet having a passage arranged therein for connecting the cartridge chamber to a further component. For example, for a two-component cartridge, the connector can comprise a common outlet for both components of the cartridge. Alternatively, each cartridge chamber can comprise a connector, wherein the two connectors of the two-component cartridge form a common outlet for the cartridge.

Preferably, at least one of the connector and the aperture comprises a valve. The valve can be arranged within the passage of the outlet. The valve can be removable from said aperture. The valve can be designed for regulating and/or directing a flow of the material component or medium when filling the cartridge chamber via the connector respectively via the aperture.

Preferably, the connector is sealingly inserted within the cartridge head by means of at least one of a screwed connection, a bayonet type of connection, a plug and rotate type of connection, an adhesive bond, a thermal welding bond, an ultrasonically welded bond, a press and/or interference fit, and a snap in connection.

Preferably, the aperture of the head part comprises an inner thread and the connector comprises an outer thread mating with said inner thread of said aperture. The connector can be designed to be screwed into the aperture of the cartridge head part via the corresponding outer and inner threads. This allows a stable connection between the head part of the cartridge and the connector, such that the aperture can be safely closed by the connector.

Preferably, a seal is arranged between the head part and the connector. In particular, said seal can be arranged between the aperture and the connector and/or at said connector. The seal allows to avoid an uncontrolled and/or undesired leaking of the medium or component comprised within the cartridge chamber.

Preferably, the connector comprises a second thread at a side of the connector disposed opposite to the outer thread. Preferably, a diameter of the second thread differs from a diameter of said outer thread. Preferably, said second thread is one of an inner thread and an outer thread. The second thread can be designed to be mated with a further thread, such as for example a thread of a filling mandrel of a filling station. Upon filling the cartridge chamber, a tight and secure connection can be realized between the filling mandrel and the cartridge chamber via the connector.

Preferably, when the cartridge is designed as a multi-component cartridge, said multicomponent cartridge comprises one of a combined outlet comprising two outlets formed by a common connector installed in two separate apertures and two separate outlets with each outlet being formed by a separate connector installed in a separate aperture and with the separate outlets being combinable to form a common outlet. The different components of the cartridge can be therefore mixed and/or be combined when they are dispensed simultaneously via the common outlet. However, the separate apertures allow each chamber of the multi-component cartridge to be filled or refilled separately from the other chamber, such that an undesired mixing or bonding of the different components can be avoided upon refilling.

Preferably, the cartridge comprises a further aperture configured as a filling port in the cartridge chamber and the filling port being able to be closed off in a releasable and sealing manner via a and/or the terminal connector. The terminal connector can comprise a film extending over a surface facing the cartridge chamber.

Preferably, on installing the two separate connectors in the two separate outlets the two connectors are axially moved in the direction of the respective outlet and/or are rotated into the position in which they form the common outlet.

Preferably, the separate connectors are connectable to one another via at least one of a snap fit, interference fit, press fit, a mixer connectable to the common outlet, a bayonet type connection, and a ring attachable to the common outlet. The connection between the two connectors allows a stable formation of a common outlet and hinders the two connectors to disengage from each other, for example due to applying a dispensing pressure on the cartridge.

According to another aspect embodiments of the present invention relate to a connector for a cartridge, with the connector being sealingly insertable into and removable from an aperture of a head part of the cartridge. The connector optionally further comprises a film extending over a surface of the connector with the surface facing a cartridge chamber of the cartridge when connected to the cartridge.

The advantages associated with the cartridge likewise hold true for the corresponding features of the connector.

BRIEF DESCRIPTION OF THE FIGURES

The invention will be explained in more detail hereinafter with reference to the drawings.

DETAILED DESCRIPTION

Figure 1:
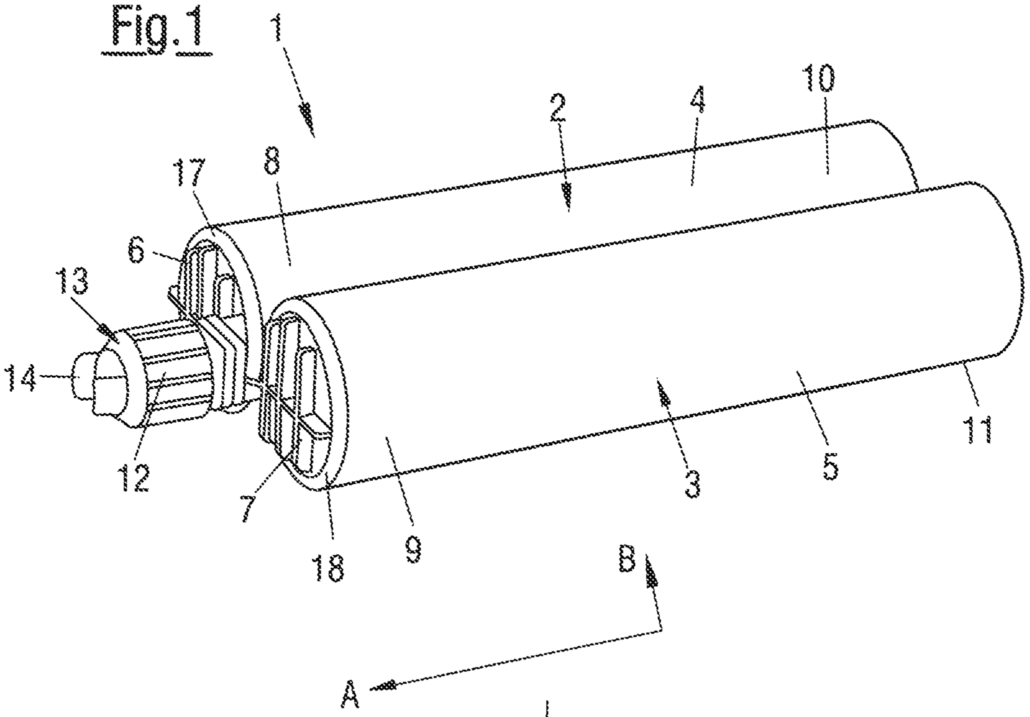
FIG. 1 is a perspective view of a two-component cartridge.

In the in the following the same reference numerals will be used for parts having the same or equivalent function. Any statements made having regard to the direction of a component are made relative to the position shown in the drawing and can naturally vary in the actual position of the application.

FIG. 1 shows an example for a two-component cartridge 1. The cartridge 1 comprises two generally cylindrical cartridge chambers 2, 3. The cartridge chambers 2, 3 are each bound by a cartridge wall 4, 5 as well as by a head part 6, 7, with each head part 6, 7 being arranged at a respective front end 8, 9 of the cartridge wall 4, 5. Each cartridge wall 4, 5 extends in a longitudinal direction A of the cartridge 1 from a respective rear end 10, 11 to the respective front end 8, 9.

Each head part 6, 7 is a stable shaped part of generally plate-like shape, which comprises a common dispensing outlet 12 via which a medium (not shown) can be dispensed from the cartridge chambers 2, 3. For this, the two components of the medium stored within the chambers 2, 3 mix or combine at the dispensing outlet 12 before being released outwardly as a combined medium from a common outlet part 14 of the dispensing outlet 12. The dispensing outlet 12 extends from the head parts 6, 7 as an outlet passage through the common outlet part 14. A mixing tip (not shown) or closure part 13 can be connected to the outlet part 14.

Each head part 6, 7 has a collar 17, 18. A radial direction B is indicated relative to the arrow A used to identify the longitudinal direction A. Each collar 17, 18 has a length extending in the longitudinal direction A. The front end 8, 9 of each cartridge wall 4, 5 is sealingly and non-releasably connected to the collar 17, 18 of the head part 6, 7.

It should be noted that the cartridge 1 can also be configured as a one-component cartridge (not shown), comprising only one generally cylindrical cartridge chamber with a single head part and a film forming the cartridge wall. In the following, corresponding features of the one-component cartridge and corresponding features of the two-component cartridge 1 mutually hold true.

Figure 2:
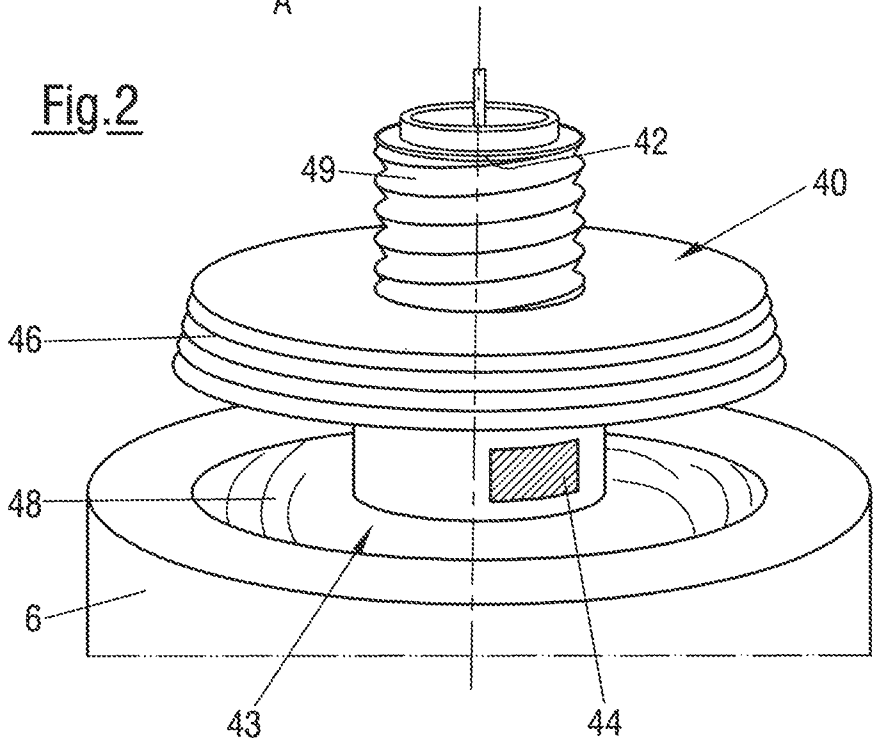
FIG. 2 is a schematic view of a connector for a cartridge.

The cartridge chambers 2, 3 are configured to be refillable with their respective component of the medium. For this, the cartridge 1 comprises a connector 40 or respectively two connectors 40 as shown in FIG. 2. In particular, the cartridge chambers 2, 3 can be refilled five or more times. When refilling the chambers 2, 3 of the two-component cartridge 1, care has to be taken in order to not accidentally refill a chamber 2, 3 with another medium component than the one that has been previously been contained by the respective chamber 2, 3. For example, a mastic medium is particularly adhesive, a chamber 2, 3 will most likely never be entirely emptied out of the mastic medium component. A mixing of different components within the chambers 2, 3 is therefore to be avoided.

The connector 40 shown in FIG. 2 is designed for a cartridge, as for example for the cartridge 1. The connector 40 is designed to be connected to an aperture 43 of a head part 6 of the cartridge 1 that is for example not formed by the dispensing outlet 12 of the cartridge 1 shown by FIG. 1.

The connector 40 comprises an outlet 42 having a passage arranged therein for connecting a cartridge chamber 2, 3 to a further component. When the connector 40 is connected to the cartridge head part 6, 7, the outlet 42 can correspond to an outlet of the respective cartridge chamber 2, 3 through which the medium component stored within the respective cartridge chamber 2, 3 is to be dispensed. The connector further comprises at least one inlet 44 through which the medium component that is to be dispensed from the cartridge chamber 2, 3 passes through.

The connector 40 further comprises an outer thread or a male thread 46 which is designed to be sealingly inserted within the aperture 43 of the cartridge 1 or one of the cartridge head parts 6, 7. The aperture 43 of the head part 6, 7 of the cartridge 1 comprises an inner thread or female thread 48 which is mating with the outer thread or male thread 46 of the connector 40. In other words, the connector 40 is designed to be screwed into the aperture 43 of the cartridge head part 6, 7 via corresponding male and female threads 46, 48. For this, an outer diameter of a cylindrically shaped male thread 46 can be chosen to correspond to an inner diameter of a cylindrically shaped aperture 43 with the female thread 48. The connector 40 further comprises a second thread 49 designed to be mated with a further thread, such as for example a thread of a filling mandrel of a storage container and/or of a filling station.

Alternatively to the connection formed by the male thread 46 and the female thread 48, the connector can form with the aperture 43 of the cartridge head part 6, 7 a screwed connection, a bayonet type of connection, a plug and rotate type of connection, an adhesive bond, a thermal welding bond, an ultrasonically welded bond, a press and/or interference fit, and/or a snap in connection.

The connector can be used for or alternatively be removed when refilling the respective cartridge chamber 4, 5. A filling can then occur via the outlet 42 or directly via the aperture 43. The use of such a connector 40 on filling can aid in avoiding a cross contamination between the one or more outlets from the cartridge 1 further ensuring the lifetime of the cartridge 1.

Figure 3:
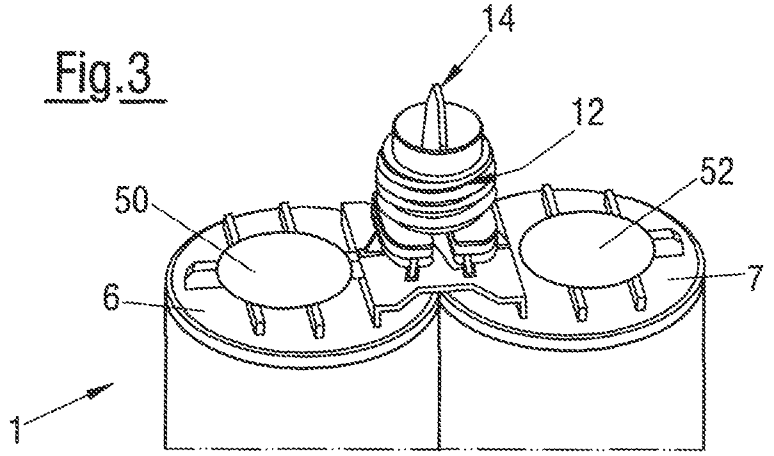
FIG. 3 is a schematic view of possible positions for connection of a connector, such as the one of FIG. 2.

FIG. 3 schematically shows the head parts 6, 7 with the common dispensing outlet 12 of the cartridge 1 as described for FIG. 1. Each head part 6, 7 comprises a filling connector port 50, 52 designed to provide a connection interface to connect the connector 40 to a respective cartridge chamber 2, 3 of the cartridge 1 via the filling connector ports 50, 52. For example, each filling connector port 50, 52 is designed as an aperture, as for example the aperture 43 shown by FIG. 2.

The cartridge 1 can comprise in total two connectors 40 as shown in FIG. 2. Each cartridge chamber 2, 3 is filled with a medium respectively component via the connectors 40. The connectors 40 therefore provide a support for a filling process. For example, the outlet 42 connects to a storage container filled with the medium component to be filled into the cartridge chamber 6.

When it is determined that a connector 40 respectively its outlet 42 has spanned its lifetime, for example because too much residue of the medium component has accumulated within a valve of the connector 40 or the outlet 42, the connector 40 can be simply replaced without having to replace the entire cartridge head part 6, 7 respectively cartridge 1.

Alternatively the connector can be a terminal connector that is insertable into the connector ports 50, 52 once the connectors 40 have been removed after their purpose of filling or re-filling the cartridge. The terminal connectors then typically comprise a film at a surface facing into the cartridge chamber 2, 3 in order to ensure a sufficient storage life of materials stored in the cartridge chambers 2, 3.

Figure 4A:
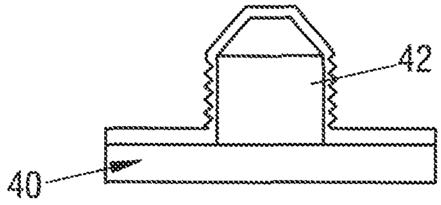
FIG. 4A is a schematic view of a further embodiment of the connector.
Figure 4B:
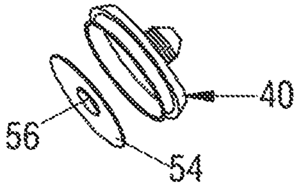
FIG. 4B is an exploded view of the connector of FIG. 4A with a film.
Figure 5A:
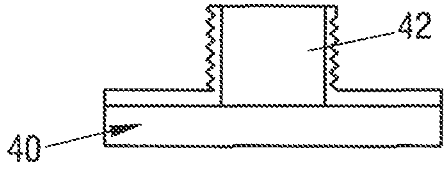
FIG. 5A is a schematic view of a further embodiment of the connector.
Figure 5B:
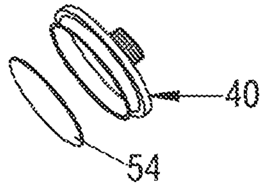
FIG. 5B is an exploded view of the connector of FIG. 5A with a film.
Figure 6A:
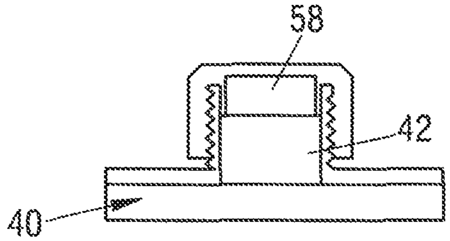
FIG. 6A is a schematic view of a further embodiment of the connector.

FIGS. 4A, 5A and 6A schematically show further embodiments of the connector 40, wherein FIGS. 4B, 5B and 5C show an exploded-view of the respective connector 40 shown by FIGS. 4A, 5A and 6A. An outlet 42 of the connector 40 can be closed (shown in FIG. 4A) or opened (shown in FIGS. 5A and 6A). In order for the medium respectively component stored with the cartridge chamber 2, 3 to not leak or flow outwards, the outlet 42 of the connector 40, a film 54 is arranged between the connector 40 and the aperture 43 of the head part 6, 7 of the cartridge 1.

In the example shown FIGS. 4A and 4B, the film 54 comprises an aperture 56, since the outlet 42 is closed. When refilling the cartridge 40 via the closed outlet 42 shown in FIGS. 4A and 4B, the outlet 42 can be designed to burst upon positioning the filling mandrel on the outlet 42, for example.

The outlet 42 of the connector 40 shown by FIGS. 5A and 5B is opened, i.e., the medium can freely flow through. In order to prevent this, the film 54 is entirely closed, i.e. a surface of the film 54 completely covers the aperture 43 of the head part 6, 7 of the cartridge 1.

When refilling the cartridge 1 via the outlet 42, the film 54 is designed to burst when positioning the filling mandrel on the outlet 42, for example. In addition or alternatively, if the outlet 42 is designed as a dispensing outlet, the film 54 is designed to burst upon applying a dispensing pressure, such that the medium or component can freely flow through, alternatively the film 45 can be designed to be pierced by a component or to be opened in a different way, such as by a film removable by hand.

Figure 6B:
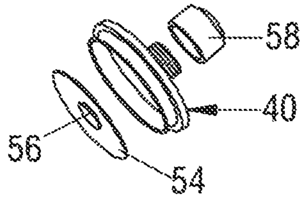
FIG. 6B is an exploded view of the connector of FIG. 6A with a film.

The outlet 42 of the connector 40 shown by FIGS. 6A and 6B is opened and the film 54 comprises an aperture 56. In order to avoid a leaking of the medium or component, the connector 40 further comprises a cap 58 designed to be arranged on the outlet 42. In contrast, the two embodiments of the connector 40 shown by FIGS. 4A, 4B, 5A and 5B do not require a cap 58 in order to avoid a leaking.

Figure 7:
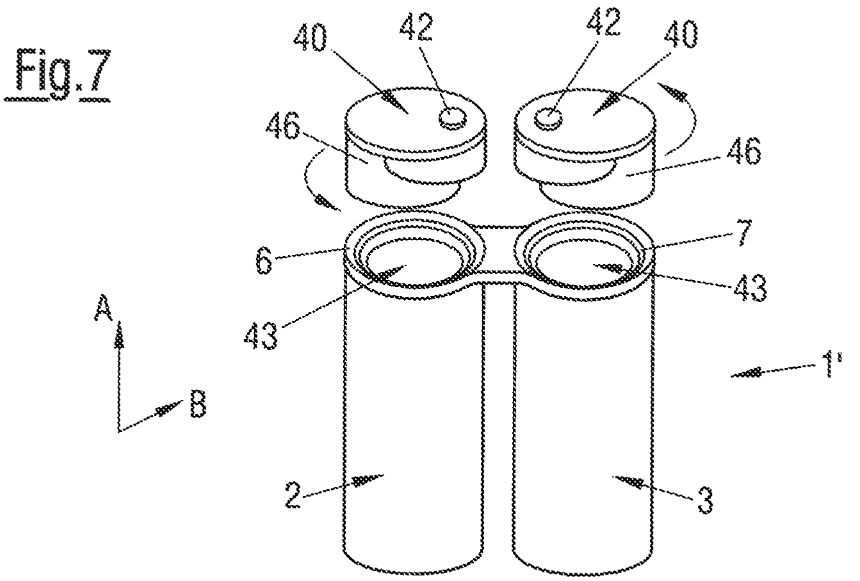
FIG. 7 is a perspective view of a two-component cartridge and two connectors to be arranged thereon.
Figure 8:
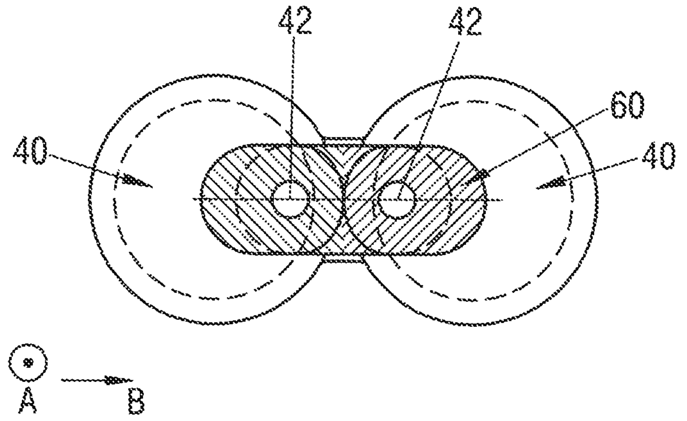
FIG. 8 is a top view of the two connectors shown in FIG. 7.
Figure 9:
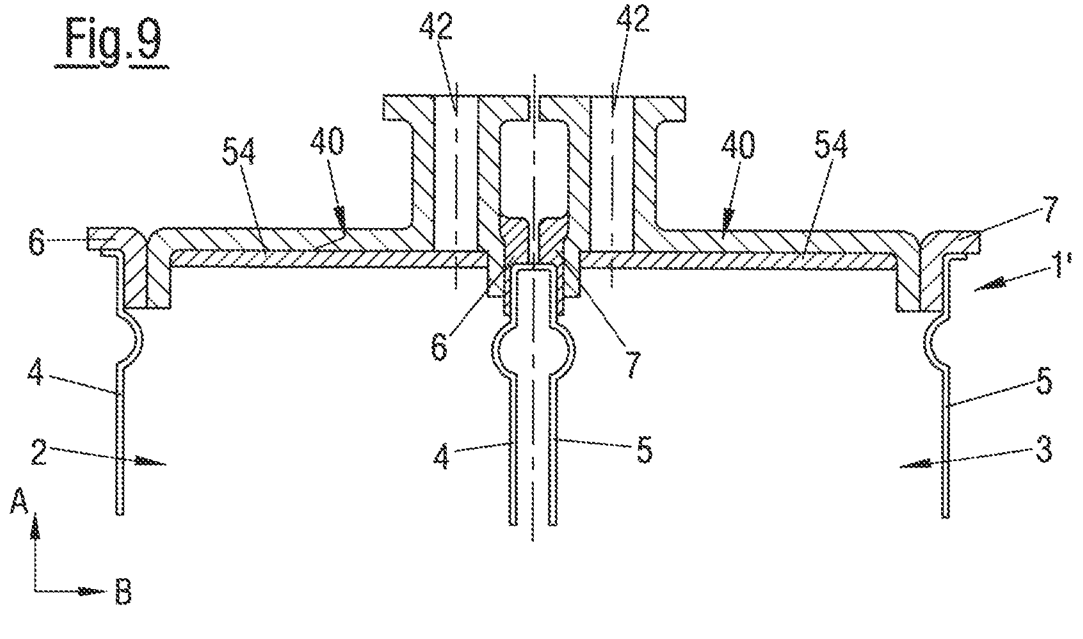
FIG. 9 is a cross-sectional view of the two connectors of FIG. 7 arranged on the two-component cartridge of FIG. 7.

FIGS. 7, 8 and 9 show from a perspective, top and cross-sectional view respectively a two-component cartridge 1' that, unlike the cartridge 1 shown by FIGS. 1 and 3, does not comprise a separate outlet 14. Instead, the head parts 6, 7 of the cartridge 1' each comprise an aperture 43 on which a respective connector 40 is to be arranged. For example, each connector 40 can be screwed separately onto the aperture 43 of the head part as shown by FIG. 2.

When arranged at the apertures 43, the two connectors 40 form a snap fit connection with each other. Alternatively, the two connectors 40 can form for example an interference fit or a press fit or a bayonet type connection. In other words, the two connectors 40 are designed to snap into each other. For this, the two connectors 40 can comprise complementary shapes, as shown for example by FIG. 8. The complementary shapes can intertwine respectively interlock together to form a combined connector. The combined connector can form a common dispensing outlet 60 for the two cartridge chambers 2, 3 that is provided by the two outlets 42 of the connectors 40.

As shown by FIG. 9, each connector 40 comprises a film 54 that extends over the entire radial surface of the aperture 43 of a respective cartridge chamber 2, 3. The outlets 42 of the two connectors 40 are therefore sealed against the medium contained by the cartridge chamber 2, 3. When dispensing the medium for the first time, the film 54 is configured to burst in the region covering the outlet 42 on applying a dispensing pressure on the cartridge 1'. Alternatively, the connector 40 can comprise a film 54 with an aperture 56 in the region of the outlet 42 as shown by FIGS. 4B and 6B. Furthermore, a valve (not shown) can be arranged within the outlet 42 in order to regulate or direct a flow of the component or medium comprised by the cartridge chamber 2, 3.

Figure 10:
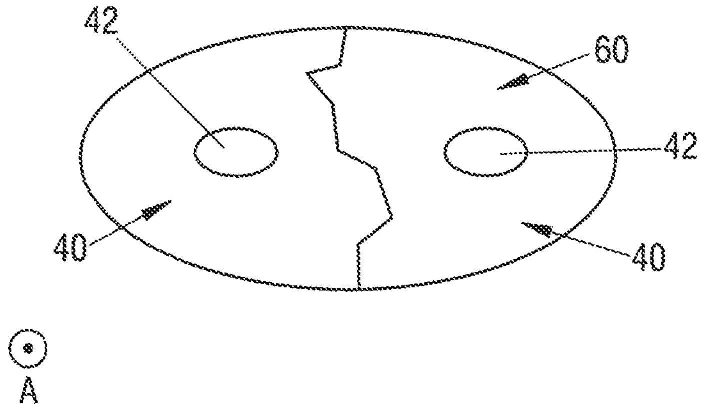
FIG. 10 is a top view of two connectors according to a further embodiment forming a snap fit.
Figure 11:
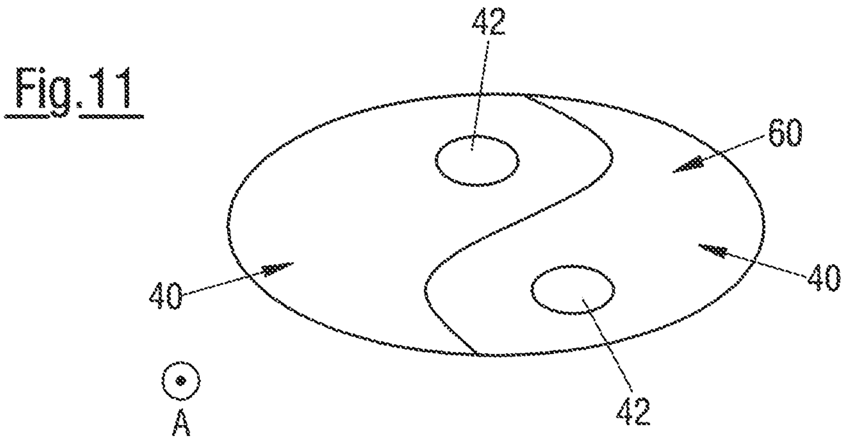
FIG. 11 is a top view of two connectors according to a further embodiment forming a snap fit.
Figure 12:
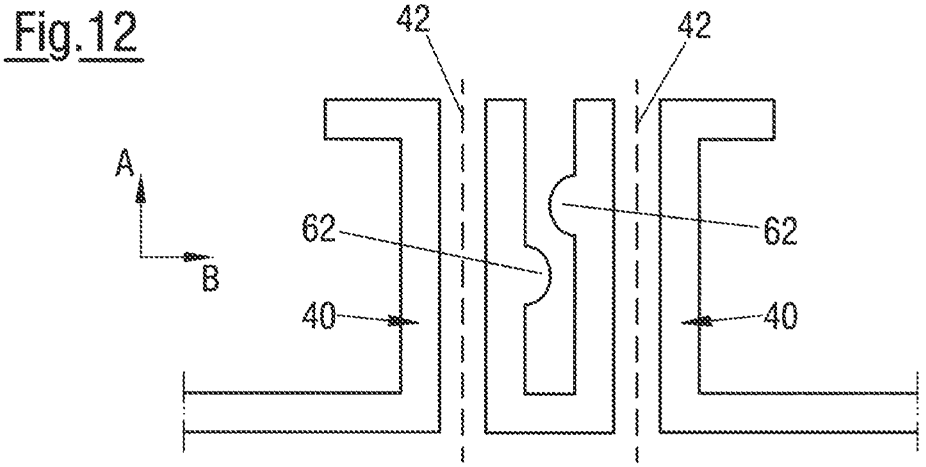
FIG. 12 is a cross-sectional view of two connectors according to a further embodiment forming a snap fit.

FIGS. 10, 11 and 12 show further possible variants of the two connectors 40 forming a snap fit as the two connectors 40 shown in FIGS. 8 and 9. As shown by FIG. 10, the shapes of the two connectors 40, as shown here for example from a top view, can be any given as long as the two shapes are complimentary. The two shapes can therefore resemble two puzzle pieces. In addition, as shown by FIG. 11, the two connectors 40 can comprise the same shape, with the two shapes engaging with each other. Moreover, the shapes engaging with each other can at least partially be formed along a radial surface of the connectors 40. As shown by FIG. 12 in a cross-sectional view, the radial surface of each connector 40 comprises a protrusion 62 respectively a snap-in nose, wherein the two protrusions 62 of the two connectors 40 are arranged such that the two protrusions 62 face each other when the two connectors 40 are arranged on the apertures 43 of the cartridge 1'. Further, the two protrusions 62 are positioned on different heights along a longitudinal direction A of the connectors 40. In this way, the two protrusions 62 can engage with each other and hinder the two connectors 40 from disengaging when the two connectors 40 are installed on the apertures 43 of the head part 6, 7 of the cartridge 1'. Alternatively, one of the two connectors 40 can comprise a groove and the other connector 40 can comprise a protrusion designed to be received by the groove.

The invention claimed is:

1. A multicomponent cartridge comprising:

a head part including a filling port, a first aperture leading from an outer side of the head part to a first cartridge chamber and a second aperture leading from the outer side of the head part to a second cartridge chamber, the head part bounding front ends of the first and second cartridge chambers; and a common connector sealingly insertable into and removable from the first and second apertures, the connector including a first connector having a first outlet and a second connector having a second outlet separate from the first outlet, at least one of the first or second outlets having a film extending over a surface of the common connector with the surface facing at least one of the first or second cartridge chambers, and the common connector configured to be sealingly insertable and removable within the head part, such that the first and second outlets are separately installed in the first and second apertures, respectively, and the first and second apertures being combinable to form a common outlet, the first and second outlets extend from the first and second connectors, respectively, and are configured to each attach to a device to fill the first and second cartridges with a respective medium.

2. The multicomponent cartridge in accordance with claim 1, wherein the first and second apertures are separate from the first and second outlets of the cartridge.

3. The multicomponent cartridge in accordance with claim 1, wherein each of the first and second outlets have a passage arranged therein for connecting the first and second cartridge chambers to a further component.

4. The multicomponent cartridge in accordance with claim 1, wherein a seal is arranged between the first and second apertures and the common connector or the seal is arranged at the common connector.

5. The multicomponent cartridge in accordance with claim 1, wherein each of the first and second apertures are configured as a filling port for the first and second cartridge chambers, respectively, and each of the filling ports being able to be closed off in a releasable and sealing manner via of at least one of the first and second connectors of the common connector.

6. The multicomponent cartridge in accordance with claim 1, wherein the first and second connectors are connectable to one another via at least one of a snap fit, interference fit, press fit, a mixer connectable to the common outlet, a bayonet type connection, and a ring attachable to the common outlet.

7. The multicomponent cartridge in accordance with claim 3, wherein the film is configured to burst in a region of the first and second outlets upon application of a dispensing pressure on the multicomponent cartridge.

8. The multicomponent cartridge in accordance with claim 1, wherein the first and second apertures are separate from the first and second outlets of the multicomponent cartridge and the common connector comprises the film for storage.

9. The multicomponent cartridge in accordance with claim 1, wherein at least one of the first and second connectors or the first and apertures comprises a valve.

10. The multicomponent cartridge in accordance with claim 1, wherein the first and second connectors are sealingly inserted within the head part by at least one of a screwed connection, a bayonet type of connection, a plug and rotate type of connection.

11. The multicomponent cartridge in accordance with claim 1, wherein each of the first and second apertures comprises an inner thread and each of the first and second connectors comprises an outer thread to mate with a respective inner thread of the first and second apertures.

12. The multicomponent cartridge in accordance with claim 11, wherein the outer thread for each of the first and second connectors is a first thread and each of the first and second connectors comprises a second thread disposed at a side of a respective one of the first and second connectors axially opposite the first thread.

13. A connector for a cartridge, the connector being sealingly insertable into and removable from first and second apertures of a head part of a first cartridge chamber and a second aperture leading from the outer side of the head part to a second cartridge, the head part including at least one filling port and bounding front ends of the first and second cartridge chambers, the connector comprising:

a film extending over a surface of the connector with the surface facing at least one of the first or second cartridge chambers when connected to the cartridge, and the connector including a first connector having a first outlet and a second connector having a second outlet separate from the first outlet, each of the first and second outlets configured to be sealingly insertable and removable within the head part such that the first and second outlets are separately installed in the first and second apertures, respectively, and the first and second apertures being combinable to form a common outlet, the first and second outlets extend from the first and second connectors, respectively, and are configured to each attach to a device to fill the first and second cartridges with a respective medium.

* * * * *